Figure 1:
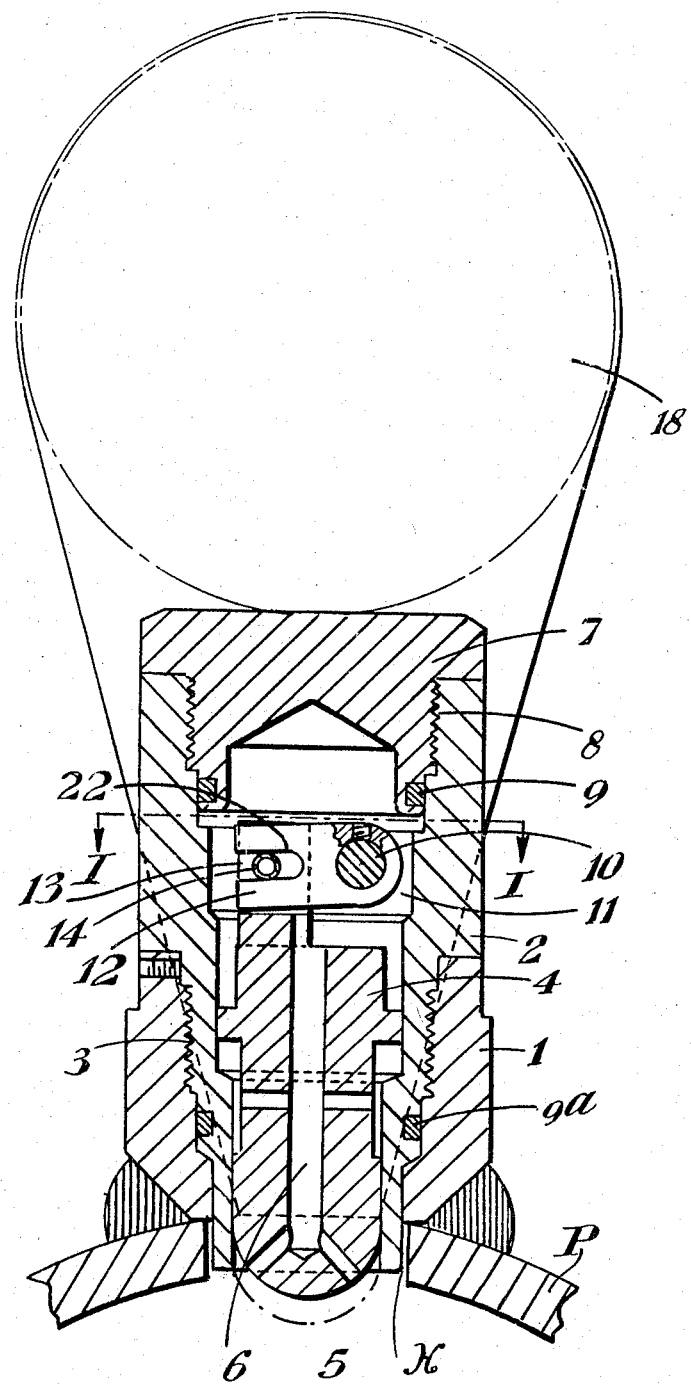

Feb. 28, 1967     W. R. SUTTIE     3,306,251
PIPE LINE PIG OR SPHERE LOCATING DEVICES
Filed Jan. 18, 1965     2 Sheets-Sheet 2
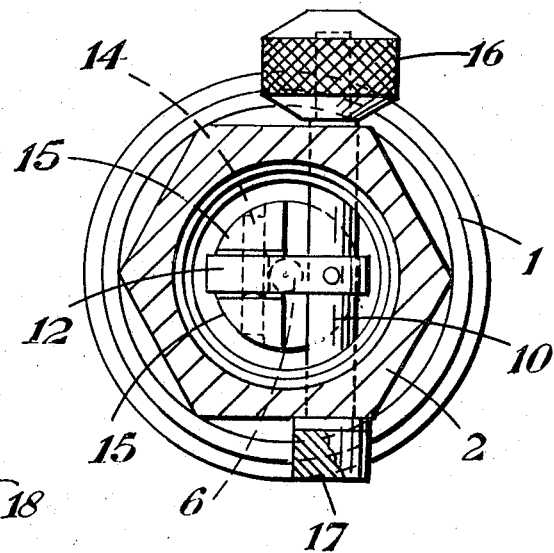
*Fig.2.*     *Fig.3.*
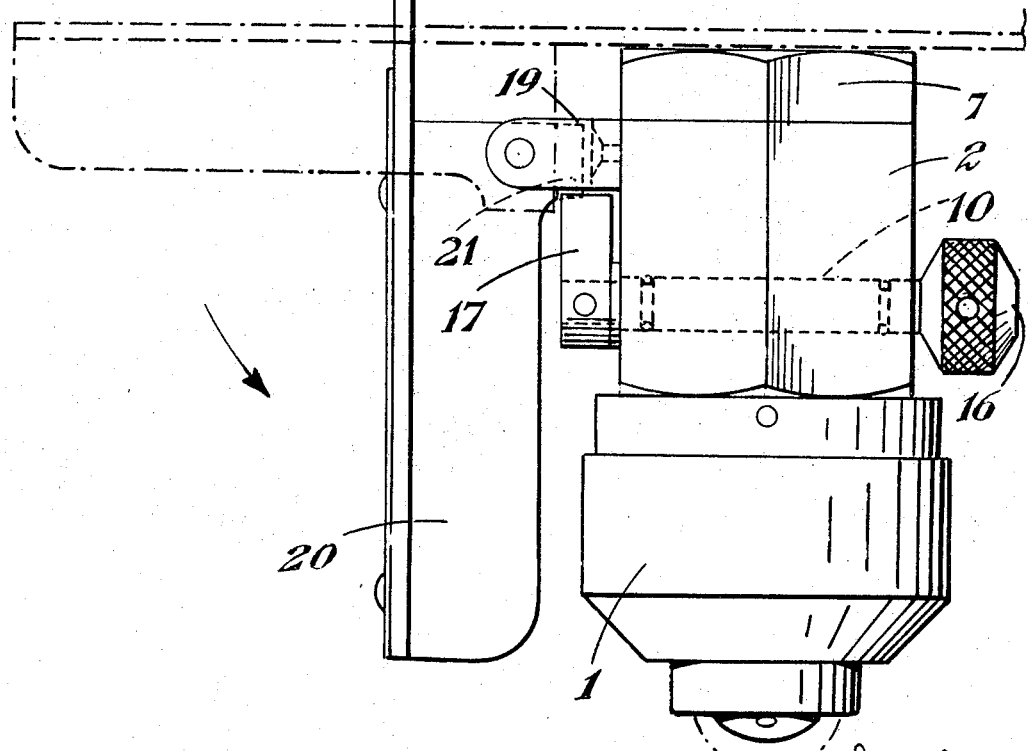
Inventor:
Walter Robert Suttie
By Baldwin & Wight
Attorneys United States Patent Office 3,306,251

Patented Feb. 28, 1967

3,306,251

PIPE LINE PIG OR SPHERE LOCATING DEVICES

Walter Robert Suttie, Creswell, near Worksop, England, assignor to General Descaling Company Limited, Worksop, England, a corporation of the United Kingdom Filed Jan. 18, 1965, Ser. No. 426,077

Claims priority, application Great Britain, Sept. 16, 1964, 37,860/64

9 Claims. (Cl. 116—124)

This invention relates to devices for indicating the passage of a "pig" or "go-devil" past a given point in a pipe line.

According to the present invention a device for indicating the passage of a pig or go-devil past a given point in a pipe line, comprises a housing for mounting on the pipe line so as to surround a hole formed in the wall thereof, a support member accommodated at least partially within the housing, a spindle rotatable within the support member, and extending transversely to the longitudinal axis of the housing, an impact member rigidly attached to the spindle and extending normal to the axis thereof and to which angular movement is imparted by a pin mounted on a plunger, the plunger being axially displaceable within the support member to cause angular displacement of said spindle, in response to the passage of a pig through the pipe beneath the plunger, and means responsive to angular displacement of the spindle for providing an indication of the displacement.

A preferred embodiment of the invention is described hereinafter with reference to the accompanying drawing in which:

FIGURE 1 is a view in section of a pig-signalling device seen from the direction of the axis of the pipe line;

FIGURE 2 is a side view of the device shown in FIGURE 1, and

FIGURE 3 is a plan view in section on the line I—I.

Referring to the drawings the pig-signalling device comprises a cylindrical housing 1 which may be attached to a pipe line P, for example, by welding, so as to surround a hole H, formed or to be formed in the wall of the pipe line P. A hollow cylindrical support member 2 is fitted within the housing 1 and is externally threaded for cooperation with an internally threaded portion 3 of the housing 1. Taken together, housing 1 and support member 2 comprise a hollow body member for the device of this invention. The support member 2 has an axial bore in to which is fitted a cylindrical plunger 4 formed at its lower end with a domed head 5 which normally extends a short distance into the pipe line P. The plunger 4 is pierced by a fluid passage 6 to permit the passage therethrough of liquid in the pipe line P, so as to equalize the liquid pressure on each end of the plunger 4. The upper end of the cylindrical support member is sealed by a cap 7 externally screw threaded for engagement with an internally screw threaded portion 8 of the support member 2. Additionally O-ring seals 9 and 9*a* are provided respectively between the cap 7 and the support member 2, and between the support member 2 and the housing 1.

A spindle 10 is located within a chamber 11 defined by the space within the housing 2 between the upper end of the plunger 4 and the cap 7. The spindle 10 extends transversely to and is laterally offset from the longitudinal axis of the housing 1 and is supported for angular displacement between the walls of the support member 2. The spindle 10 carries a crank member 12 in the form of a link one end of which is fast on the spindle 10 and the other end of which is slotted as at 13 to receive a pin 14 supported by lugs 15 extending upwardly from the upper end of the plunger 4.

The ends of the spindle 10 extend through the wall of the support member 2 and carry respectively a handle or knob 16 and a latch arm 17. An indicating plate or "flag" 18 is pivotally attached to a bracket 19 externally mounted on the wall of the support member 2, the indicating plate 18 being provided with a weight 20 forming biasing means urging, and tending to retain, the plate 18 in a vertical attitude, in which attitude the plate can be observed from a distance.

When the plate is pivoted to a horizontal position it may be retained in that position by means of the latch arm 17 carried by the spindle 10. This is achieved by rotating the knob 16 on the spindle 10 until the latch arm 17 engages with an abutment 21 on the weight 20. Angular displacement of the spindle 10 simultaneously angularly displaces the crank member, so that the upper face 22 of the slot 13 bears against the pin 14, causing the plunger 4 to be downwardly displaced until its domed head 5 enters the pipe line P. The device is now set for recording the passage of a pig.

On passage of the pig, past the device the plunger 4 is forced upward and in turn the pin 14 angularly displaces the crank member and the spindle 10. Angular displacement of the spindle 10 in turn moves the latch arm 17 free from the abutment 21 on the indicating plate 18 which is then free to drop, and assume a vertical position, thus providing a visual indication of the passage of the pig.

What is claimed is:

1. A device for indicating the passage of a pig or go-devil past an opening in a pipe line at a given point along the length thereof, said device comprising a hollow body member having at least one open end, said body member being adapted at said open end to be attached to said pipe line at said given point and to completely enclose said opening therein, plunger means slidably mounted in the interior of said body member and movable in response to forces generated by the passage of a pig or go-devil past said opening in said pipe line, visual indicator means mounted on the exterior of said body member and movable between a first and a second position, and means for moving said visual indicator from said first position to said second position comprising biasing means effective when said visual indicator is in said first position for urging said visual indicator toward said second position thereof, latch means for latching said visual indicator in said first position thereof in opposition to said biasing means, and coupling means connected between said latch means and said plunger to unlatch said latch means in response to said movement of said plunger, thereby releasing said visual indicator for movement from said first to said second position thereof to indicate the passage of said pig or go-devil past said opening in said pipe line.

2. The combination defined in claim 1 wherein said visual indicator means comprises a flag member pivotally connected to the exterior of said body member and movable between a horizontal position and a vertical position, said biasing means comprising a weight attached to said flag member in such relationship as to urge said flag member toward the vertical position thereof, said latch means comprising a latch member pivotally connected to the exterior of said body member and movable between a first and second position, said latch member being positioned to obstruct the movement of said flag member in said first position thereof and to permit movement of said flag member in said second position thereof and said coupling means comprising means for moving said latch member from said first to said second position thereof in response to said movement of said plunger thereby releasing said flag member for movement from said horizontal to said vertical position thereof to indicate the passage of said pig or go-devil past said opening in said pipe line.

3. The combination defined in claim 2 wherein said coupling means comprises a spindle extending through said hollow body member and journaled for movement about an axis transverse to the axis of said plunger, said latch member being attached to one end of said spindle exterior to said body member, and crank means connected between said plunger and said spindle within said body member to rotate said spindle in response to movement of said plunger.

4. The combination defined in claim 3 and also including a knob attached to the other end of said spndle exterior to said body member for manually rotating said spindle to move said latch member between said first and second positions thereof.

5. The combination defined in claim 4 wherein the axis of said spindle is laterally offset from the axis of said plunger, said crank means being rigidly attached to said spindle and being pivotally connected to the adjacent end of said plunger, whereby said crank member translates a linear movement of said plunger into a rotary movement of said spindle and vice versa.

6. The combination defined in claim 5 wherein said weight comprises a relatively long, flat piece of material, said flag member being attached to one surface of said weight and extending a substantial distance beyond one end thereof, said weight being pivotally connected to the exterior of said body member at said one end thereof for movement between a horizontal position and a vertical position, and said spindle and latch member being positioned so that said latch member abuts against said one end of said weight when the weight is in its horizontal position and the latch member is in its first position to hold said weight and said flag member in a horizontal position against the force of gravity, and said latch member being shaped so as to disengage from said abutting position with respect to said one end of said weight when moved to said second position thereof, thereby releasing said weight and said flag member to move to their vertical position under the influence of the gravitational force acting on said weight.

7. The combination defiined in claim 6 wherein said body member comprises a hollow cylindrical housing open at both ends and adapted at one end to be attached to said pipe line at said given point and to completely enclose said opening therein, a hollow support member open at both ends and removably secured near one end thereof to the other end of said housing, a cap member removably secured to the other end of said support member, and fluid sealing means connected between said housing and said support member and between said support member and said cap member.

8. The combination defined in claim 7 in which one portion of said support member extends through the interior of said housing and projects from the interior of the end thereof adapted to be attached to said pipe line, said projecting portion of said support member being smaller in its outside diameter than said opening so as to project into said opening when said housing member is attached to said pipe line at said given point, and said housing being larger in its outside diameter than said opening and being adapted by means of a bevel on said one edge thereof to be welded to said pipe line at said given point.

9. The combination defined in claim 8 wherein the inner surface of said support member is dimensioned to receive said plunger in sliding engagement and to limit the downward movement thereof, the outer surface of said support member being hexagonal in form above said housing, said spindle extending through said support member above said housing between two opposing faces of said hexagonal surface, and said weight being pivotally connected to one of said opposing faces.

References Cited by the Examiner

UNITED STATES PATENTS

| | | | |
|---|---|---|---|
| 177,840 | 5/1876 | Hoxie | 73—228 |
| 1,597,668 | 8/1926 | Brier | 33—147 |
| 1,683,710 | 9/1928 | Zitzmann | 73—119 |
| 2,077,123 | 4/1937 | Mahr | 33—172 |
| 2,371,251 | 3/1945 | Mauldin | 116—124 |
| 2,782,407 | 2/1957 | Ver Nooy | 340—282 |
| 2,960,961 | 11/1960 | Seger | 116—127 |
| 3,109,410 | 11/1963 | Ver Nooy | 116—124 |

FOREIGN PATENTS 974,014  11/1964  Great Britain.

LOUIS J. CAPOZI, *Primary Examiner.*